United States Patent
Nakashima et al.

(10) Patent No.: US 9,269,989 B2
(45) Date of Patent: Feb. 23, 2016

(54) ELECTRIC POWER SUPPLY SYSTEM

(75) Inventors: Takeshi Nakashima, Moriguchi (JP); Hiromichi Namikoshi, Nishinomiya (JP)

(73) Assignee: PANASONIC INTELLECTUAL PROPERTY MANAGEMENT CO., LTD. (JP)

( * ) Notice: Subject to any disclaimer, the term of this patent is extended or adjusted under 35 U.S.C. 154(b) by 1008 days.

(21) Appl. No.: 13/426,942

(22) Filed: Mar. 22, 2012

(65) Prior Publication Data

US 2012/0228943 A1 Sep. 13, 2012

Related U.S. Application Data

(63) Continuation of application No. PCT/JP2011/073691, filed on Oct. 14, 2011.

(30) Foreign Application Priority Data

Oct. 15, 2010 (JP) ................................ 2010-233125

(51) Int. Cl.
| | |
|---|---|
| H02J 1/00 | (2006.01) |
| H01M 10/42 | (2006.01) |
| H01M 10/46 | (2006.01) |
| H02J 1/10 | (2006.01) |
| H02J 1/14 | (2006.01) |
| H02J 7/35 | (2006.01) |

(52) U.S. Cl.
CPC ............ *H01M 10/42* (2013.01); *H01M 10/465* (2013.01); *H02J 1/108* (2013.01); *H02J 1/14* (2013.01); *H02J 7/35* (2013.01); *Y02E 10/50* (2013.01); *Y10T 307/625* (2015.04)

(58) Field of Classification Search
CPC ..... H01M 10/42; H01M 10/465; H02J 1/108; H02J 1/14; H02J 7/35; Y10T 307/625
See application file for complete search history.

(56) References Cited

FOREIGN PATENT DOCUMENTS

| JP | 5-184083 A | 7/1993 |
|---|---|---|
| JP | 2002-281692 A | 9/2002 |
| JP | 2003-111301 A | 4/2003 |
| JP | 2007-124864 A | 5/2007 |

OTHER PUBLICATIONS

International Preliminary Report on Patentability for International Application No. PCT/JP2011/073691, issued Apr. 16, 2013, with English translation.
Written Opinion of the International Searching Authority for for International Application No. PCT/JP2011/073691, mailed Jan. 17, 2012.

*Primary Examiner* — Daniel Cavallari
(74) *Attorney, Agent, or Firm* — Cantor Colburn LLP (57) ABSTRACT

There is provided an electric power supply system comprising a secondary battery unit which stores electric power generated by a solar cell module, a charge switch circuit which disconnects and connects a charge path between the solar cell module and the secondary battery unit, and a charge and discharge control unit which controls the disconnection and the connection of the charge path by the charge switch circuit, wherein, in the charge switch circuit, the disconnection and the connection of the charge path is controlled by an output voltage of the solar cell module when the charge switch circuit cannot be controlled by the charge and discharge control unit.

1 Claim, 4 Drawing Sheets

FIG. 4

ELECTRIC POWER SUPPLY SYSTEM

CROSS REFERENCE TO RELATED APPLICATION

The present application is a continuation application of International Application No. PCT/JP2011/073691, filed Oct. 14, 2011, the entire contents of which are incorporated herein by reference and priority to which is hereby claimed. The PCT/JP2011/073691 application claimed the benefit of the date of the earlier filed Japanese Patent Application No. 2010-233125, filed Oct. 15, 2010, the entire contents of which are incorporated herein by reference, and priority to which is hereby claimed.

TECHNICAL FIELD

The present invention relates to an electric power supply system, and in particular to an electric power supply system having a charge and discharge control unit which executes charge and discharge control of a secondary battery.

BACKGROUND ART

Effective usage of the energy is realized with the use of an electricity storage device such as a secondary battery. For example, in recent years, solar light power generation systems have been actively developed as eco-friendly, clean energy sources. Because a solar cell module which converts the solar light into electric power does not have an electricity storage function, in some cases the solar cell module is used in combination with a secondary battery. For example, the energy is effectively used by charge and discharge control to charge the electric power generated by the solar cell module into the secondary battery and to discharge the electric power from the secondary battery in response to a request from an external load or the like.

As a technique related to the present invention, for example, Patent Literature 1 discloses a power supply device of a solar cell having a solar cell, a plurality of secondary batteries which are charged by the solar cell, a charge switch which is connected between each secondary battery and the solar cell and which controls charging of the secondary battery, a discharge switch which is connected between each secondary battery and a load, and a control circuit which controls the charge switch and the discharge switch. In this reference, the control circuit identifies the order of priority of the secondary batteries to be charged by controlling the plurality of charge switches, a secondary battery with a higher priority order is charged before a secondary battery with a lower priority order, and, after the secondary battery with the higher priority order is charged to a predetermined capacity, the secondary battery with the lower priority order is charged.

RELATED ART REFERENCES

Patent Literature

[Patent Literature 1] JP 2003-111301 A

DISCLOSURE OF INVENTION

Technical Problem

The above-described control circuit receives supply of electric power from a system as an operation power supply. However, during power outage, because the electric power cannot be supplied from the system to the control circuit, the operation of the control circuit is stopped. Therefore, there has been a problem in that the control circuit cannot control the charge switch and the discharge switch, and, consequently, the power supply device does not function.

An advantage of the present invention is provision of an electric power supply system which secures an electric power supply source even during power outage.

Solution to Problem

According to one aspect of the present invention, there is provided an electric power supply system which supplies electric power to a load which is connected, the electric power supply system comprising a secondary battery which stores electric power generated by a power generator using natural energy, a first switch unit which disconnects and connects a charge path between the power generator and the secondary battery, and a control unit which controls the disconnection and the connection of the charge path by the first switch unit, wherein, in the first switch unit, the disconnection and the connection of the charge path are controlled by an output voltage of the power generator.

Advantageous Effects of Invention

According to various aspects of the present invention, an electric power supply source can be secured even during power outage.

BEST MODE FOR CARRYING OUT THE INVENTION

Preferred embodiments of the present invention will now be described in detail with reference to the drawings. In the following description, a lithium ion secondary battery is specified as the secondary battery, but alternatively, other storage batteries which can be charged and discharged may be employed. For example, the secondary battery may be a nickel-metal hydride secondary battery, a nickel-cadmium storage battery, a lead storage battery, a metal lithium ion secondary battery, or the like.

In addition, in the following description, the same reference numerals are assigned to similar elements in all drawings, and explanation will not be repeated. Moreover, in the explanation in this text, reference numerals that have been already used are referred to as necessary.

(First Preferred Embodiment)

Figure 1:
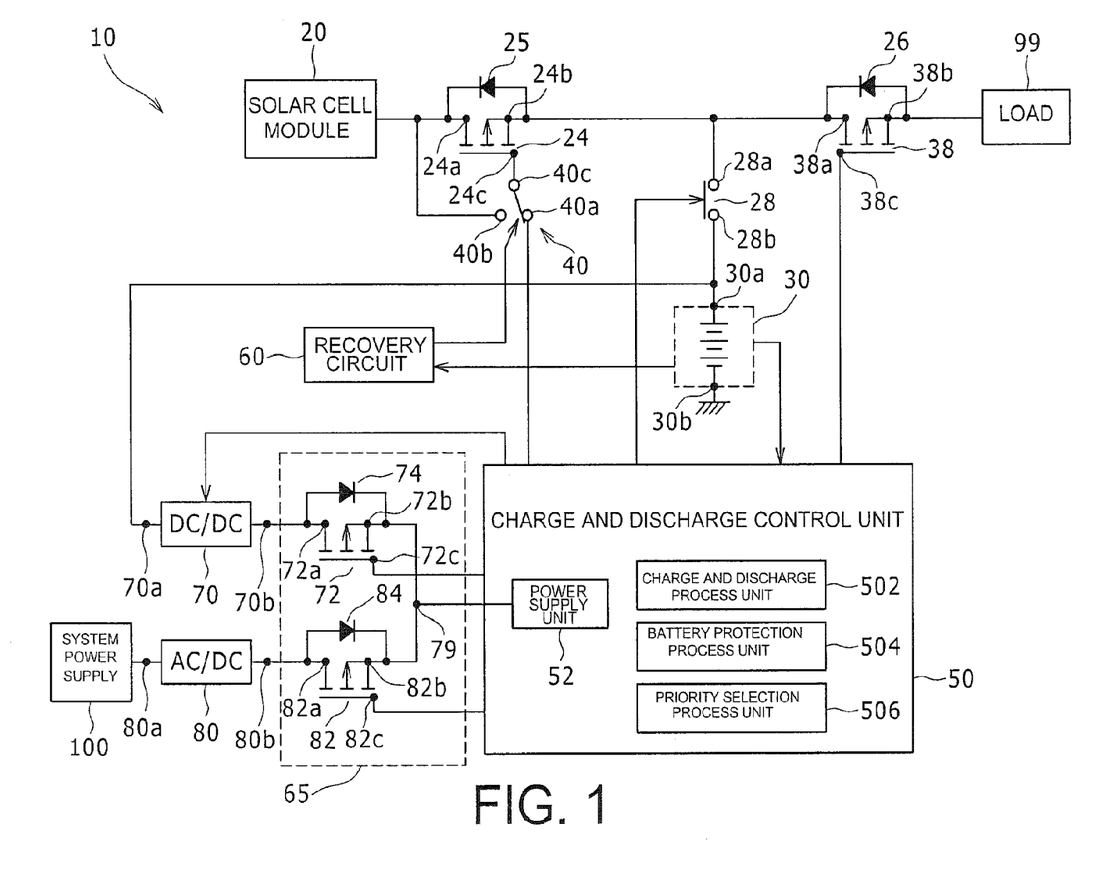
FIG. 1 is a diagram showing an electric power supply system according to a first preferred embodiment of the present invention.

FIG. 1 is a diagram showing an electric power supply system 10. The electric power supply system 10 comprises a breaker unit 28, a secondary battery unit 30, a charge switch circuit 24, a diode element 25, a discharge switch circuit 38, a diode element 26, a switching circuit 40, a charge and discharge control unit 50, a recovery circuit 60, a prioritization circuit 65, a DC-DC converter circuit 70, and an AC-DC converter circuit 80. The electric power supply system 10 is connected to a solar cell module 20, a system power supply 100, and a load 99. The electric power supply system 10 is a system for supplying to the load 99 electric power generated by the solar cell module 20 or electric power stored in the secondary battery unit 30. In addition, electric power from the system power supply 100 may be supplied to the load 99.

The solar cell module 20 is a photoelectric conversion device (power generator) which converts solar light (natural energy) into electric power. An output-side terminal of the solar cell module 20 is connected to a first terminal 24a of the charge switch circuit 24. The generated electric power generated by the solar cell module 20 is direct current power. In the electric power supply system 10, in place of the solar cell module 20, various power generators which use natural energy may be used, such as a wind power generator, a solar heat power generator, etc.

The secondary battery unit 30 stores generated electric power of the solar cell module 20, and is formed by connecting a plurality of secondary batteries in series and in parallel. A positive electrode-side terminal 30a of the secondary battery unit 30 is connected to a second terminal 28b of the breaker unit 28, and a negative electrode-side terminal 30b is grounded. In addition, charge and discharge control is applied in the secondary battery unit 30 such that an SOC (Stage Of Charge) indicating an electricity storage state corresponding to the amount of stored electricity is within a predetermined range (for example, 20%~80%). Here, the SOC (state of charge/discharge) represents the SOC in each storage state of the electric power in percentage, with a standard at the SOC at the maximum storage state of electric power being 100, and can be calculated based on a voltage of the secondary battery unit 30 or the like. The discharge electric power discharged from the secondary battery unit 30 is direct current power.

The breaker unit 28 is a device which disconnects the connection between the secondary battery unit 30 and the solar cell module 20 or between the secondary battery unit 30 and the load 99 when it is necessary to protect the secondary battery unit 30. The breaker unit 28 has a first terminal 28a and the second terminal 28b. The first terminal 28a is connected to a second terminal 24b of the charge switch circuit 24 and a first terminal 38a of the discharge switch circuit 38, and the second terminal 28b is connected to the positive electrode-side terminal 30a of the secondary battery unit 30.

The charge switch circuit 24 is a switch (first switch unit) which switches between ON and OFF for a charge path from the solar cell module 20 to the secondary battery unit 30 according to an instruction from the charge and discharge control unit 50 or an output voltage of the solar cell module 20. The charge switch circuit 24 is switched ON when the generated electric power of the solar cell module 20 is to be charged to the secondary battery unit 30, and is switched OFF when the charging is to be stopped. The charge switch circuit 24 comprises the first terminal 24a, the second terminal 24b, and a control terminal 24c. The first terminal 24a is connected to the output-side terminal of the solar cell module 20. The second terminal 24b is connected to the first terminal 38a of the discharge switch circuit 38 and the first terminal 28a of the breaker unit 28. The control terminal 24c is connected to a third terminal 40c of the switching circuit 40, and the third terminal 40c is connected to one of the charge and discharge control unit 50 and the solar cell module 20. The charge switch circuit 24 is formed from a field-effect transistor (FET).

When the third terminal 40c of the switching circuit 40 is connected to the charge and discharge control unit 50, because a control signal for ON or OFF is transmitted from the charge and discharge control unit 50 to the control terminal 24c, the charge switch circuit 24 controls switching ON or OFF of the charge path from the solar cell module 20 to the secondary battery unit 30 according to the instruction. In addition, in the charge switch circuit 24, when the third terminal 40c is connected to the solar cell module 20, because an output voltage of the solar cell module 20 is applied to the control terminal 24c, the charge path is switched ON when the output voltage becomes greater than or equal to a predetermined value, and is switched OFF when the output voltage is less than or equal to the predetermined value.

The diode element 25 is a diode having an anode terminal connected to the second terminal 24b of the charge switch circuit 24 and a cathode terminal connected to the first terminal 24a of the charge switch circuit 24. The diode element 25 is a parasitic diode which is formed when the charge switch circuit 24 is provided, but alternatively, a diode element may be separately attached.

The switching circuit 40 is a circuit (second switch unit) having a first terminal 40a, a second terminal 40b, and the third terminal 40c, with the first terminal 40a being connected to the charge and discharge control unit 50, the second terminal 40b connected to the output-side terminal of the solar cell module 20, and the third terminal 40c being connected to the control terminal 24c of the charge switch circuit 24. The switching circuit 40 switches the connection of the third terminal 40c to one of the first terminal 40a and the second terminal 40b according to an instruction from the recovery circuit 60.

When the third terminal 40c is connected to the first terminal 40a, switching ON/OFF of the charge switch circuit 24 is controlled based on a control signal from the charge and discharge control unit 50. When the third terminal 40c is connected to the second terminal 40b, the switching ON/OFF of the charge switch circuit 24 is controlled based on the output voltage of the solar cell module 20.

The discharge switch circuit 38 is a switch which switches between ON and OFF of a discharge path from the secondary battery unit 30 to the load 99 according to an instruction from the charge and discharge control unit 50. The discharge switch circuit 38 is switched ON when the electric power stored in the secondary battery unit 30 is to be discharged to the load 99 and is switched OFF when the discharging is to be stopped. The discharge switch circuit 38 has the first terminal 38a, a second terminal 38b, and a control terminal 38c. The first terminal 38a is connected to the second terminal 24b of the charge switch circuit 24 and the first terminal 28a of the breaker unit 28, and the second terminal 38b is connected to the load 99. In addition, the control terminal 38c is connected to the charge and discharge control unit 50. The discharge switch circuit 38 is formed from a field-effect transistor (FET).

Because a control signal for ON or OFF is transmitted from the charge and discharge control unit 50 to the control terminal 38c, the discharge switch circuit 38 controls the switching ON or OFF of the discharge path from the secondary battery unit 30 to the load 99 according to an instruction.

The diode element 26 is a diode having an anode terminal connected to the second terminal 38b of the discharge switch circuit 38 and a cathode terminal connected to the first terminal 38a of the discharge switch circuit 38. The diode element 26 is a parasitic diode which is formed when the discharge switch circuit 38 is provided, but alternatively, a diode element may be separately attached.

The load 99 is a load device connected to the second terminal 38b of the discharge switch circuit 38. Here, as the load 99, a load which operates with direct current power may be used, and, for example, a personal computer or the like is connected.

The DC-DC converter circuit 70 converts output electric power (for example, 96 V) of the secondary battery unit 30 functioning as an electric power supply source to electric power of a different voltage (for example, 12 V), for supply to a power supply unit 52. The DC-DC converter circuit 70 has an input-side terminal 70a connected to the positive electrode-side terminal 30a of the secondary battery unit 30 and an output-side terminal 70b connected to a first terminal 72a of a first switch circuit 72 of the prioritization circuit 65.

The system power supply 100 is an alternating current power supply which is supplied from an electric power company and which functions as an electric power supply source. The AC-DC converter circuit 80 converts the alternating current power (for example, 200 V) supplied from the electric power company into direct current power (for example, 12 V), for supply to the power supply unit 52. The AC-DC converter circuit 80 has an input-side terminal 80a connected to the system power supply 100 and an output-side terminal 80b connected to a first terminal 82a of a second switch circuit 82.

The prioritization circuit 65 sets one of the secondary battery unit 30 and the system power supply 100 as a selected supply power source and the other one as a non-selected supply power source based on an instruction from the charge and discharge control unit 50, prioritizes the selected supply source over the non-selected supply power source, and supplies electric power from the selected supply source to the power supply unit 52 of the charge and discharge control unit 50 which is a target of supply of the electric power. When the electric power supply from the power supply to the power supply unit 52 is disconnected not based on an instruction from the charge and discharge control unit 50, the prioritization circuit 65 switches, of the secondary battery unit 30 and the system power supply 100, to the connection with a power supply different from the disconnected power supply. The prioritization circuit 65 has the first switch circuit 72, a first diode element 74, the second switch circuit 82, and a second diode element 84.

The first switch circuit 72 is a switch which switches between ON and OFF of the electric power supply path from the secondary battery unit 30 to the power supply unit 52 according to an instruction from the charge and discharge control unit 50. The first switch circuit 72 has the first terminal 72a, a second terminal 72b, and a control terminal 72c. The first terminal 72a is connected to the output-side terminal 70b of the DC-DC converter circuit 70, and the second terminal 72b joins a second terminal 82b of the second switch circuit 82 at a connection point 79 and is connected to the power supply unit 52 of the charge and discharge control unit 50. The control terminal 72c is connected to the charge and discharge control unit 50. The first switch circuit 72 is formed from a field-effect transistor (FET). Because a control signal for ON or OFF is transmitted from the charge and discharge control unit 50 to the control terminal 72c, the first switch circuit 72 controls switching ON or OFF of the electric power supply path from the secondary battery unit 30 to the power supply unit 52 according to an instruction. In addition, in the state where the first switch circuit 72 is switched ON, because a voltage drop is about zero, the path is a path having a lower voltage drop than that in the first diode element 74, to be described below.

The first diode element 74 is a diode (rectifying element of a forward direction connection) having a cathode terminal connected to the second terminal 72b of the first switch circuit 72, and an anode terminal connected to the first terminal 72a of the first switch circuit 72. The first diode element 74 is a parasitic diode which is formed when the first switch circuit 72 is provided, but alternatively, a diode element may be separately attached. The first diode element 74 functions as a voltage-drop-generating unit which step-downs the voltage in the forward direction.

The second switch circuit 82 is a switch which switches between ON and OFF of the electric power supply path from the system power supply 100 to the power supply unit 52 according to an instruction from the charge and discharge control unit 50. The first switch circuit 82 has the first terminal 82a, the second terminal 82b, and a control terminal 82c. The first terminal 82a is connected to the output-side terminal 80b of the AC-DC converter circuit 80, and the second terminal 82b joins the second terminal 72b of the first switch circuit 72 at the connection point 79 and is connected to the power supply unit 52 of the charge and discharge control unit 50. The control terminal 82c is connected to the charge and discharge control unit 50. The second switch circuit 72 is formed from a field-effect transistor (FET). Because a control signal for ON or OFF is transmitted from the charge and discharge control unit 50 to the control terminal 82c, the second switch circuit 82 controls switching ON or OFF of the electric power supply path from the system power supply 100 to the power supply unit 52 according to an instruction. In a state where the second switch circuit 82 is being switched ON, the voltage drop is about zero. Therefore, the path is a path having a lower voltage drop than the voltage drop at the second diode element 84, to be described below.

The second diode element 84 is a diode (rectifying element of a forward direction connection) having a cathode terminal connected to the second terminal 82b of the second switch circuit 82 and an anode terminal connected to the first terminal 82a of the second switch circuit 82. The second diode element 84 is a parasitic diode which is formed when the second switch circuit 82 is provided, but alternatively, a diode element may be separately attached. The second diode element 84 functions as a voltage-drop-generating unit which step-downs a voltage in a forward direction.

The charge and discharge control unit 50 executes charge and discharge control by detecting a state of charge/discharge of the secondary battery unit 30 and switching ON and OFF the charge switch circuit 24 and the discharge switch circuit 38. The charge and discharge control unit 50 has the power supply unit 52, a charge and discharge process unit 502, a battery protection process unit 504, and a priority selection process unit 506. The structures of the process units of the charge and discharge control unit 50 may be realized with hardware or with software.

The power supply unit 52 supplies electric power to the charge and discharge process unit 502, the battery protection process unit 504, and the priority selection process unit 506. The power supply unit 52 is connected to the second terminal 72b of the first switch circuit 72 and the second terminal 82b of the second switch circuit 82, and supplies the electric power supplied from the secondary battery unit 30 or the system power supply 100 through the DC-DC converter circuit 70 or the AC-DC converter circuit 80 to each element of the charge and discharge control unit 50.

In normal times, the charge and discharge control unit 50 transmits a control signal for switching the switch ON to the control terminal 82c of the second circuit 82, to switch the second switch circuit 82 ON, and supply electric power from the system power supply 100 to the power supply unit 52. If the device transitions from the normal time to a power outage time in this case, the electric power cannot be supplied from the system power supply 100 to the power supply unit 52, but electric power is supplied from the secondary battery unit 30 to the power supply unit 52 through the diode 74. When the first switch circuit 72 is switched ON, the electric power is supplied from the secondary battery unit 30 to the power supply unit 52 through the first switch circuit 72. Therefore, by supplying the electric power through the prioritization circuit 65 to the power supply unit 52, it is possible to prevent stoppage of the supply of electric power to the power supply unit 52.

The charge and discharge process unit 502 acquires the SOC of the secondary battery unit 30, compares the SOC and a predetermined charge upper limit value or a predetermined discharge lower limit value, and controls ON/OFF of the charge switch circuit 24 and the discharge switch circuit 38 based on a result of the comparison. The predetermined charge upper limit value and the predetermined discharge lower limit value are reference values for preventing the secondary battery unit 30 from entering an excessively charged state or an excessively discharged state. As the charge upper limit value, for example, the SOC of 90% may be employed or the SOC of 70% may be employed. As the discharge lower limit value, for example, the SOC of 10% may be employed or the SOC of 30% may be employed. For charging the generated electric power generated by the solar cell module 20 to the secondary battery unit 30, the charge and discharge process unit 502 transmits a control signal for switching the switch ON to the control terminal 24c of the charge switch circuit 24, to switch the charge switch circuit 24 ON. In addition, for supplying the electric power stored in the secondary battery unit 30 to the load 99, the charge and discharge process unit 502 transmits a control signal to switch the switch ON to the control terminal 38c of the discharge switch circuit 38, to switch the discharge switch circuit 38 ON.

Moreover, when the charge and discharge process unit 502 judges that the SOC of the secondary battery unit 30 becomes larger than the charge upper limit value, the charge and discharge process unit 502 transmits a control signal for switching the switch OFF to the control terminal 24c of the charge switch circuit 24, to switch the charge switch circuit 24 OFF.

Furthermore, when the charge and discharge process unit 502 judges that the SOC of the secondary battery unit 30 is lower than the discharge lower limit value, the charge and discharge process unit 502 transmits a control signal for switching the switch OFF to the control terminal 38c of the discharge switch circuit 38, to switch the discharge switch circuit 38 OFF.

The battery protection process unit 504 stops the supply of electric power from the secondary battery unit 30 to the power supply unit 52 when the output voltage of the secondary battery unit 30 becomes lower than a predetermined protection reference voltage value during power outage. More specifically, the battery protection process unit 504 acquires, when the electric power is supplied from the secondary battery unit 30 to the power supply unit 52 during the power outage, the output voltage of the secondary battery unit 30, and judges whether or not a value of the output voltage is lower than the predetermined protection reference voltage value. When the battery protection process unit 504 judges that the output voltage of the secondary battery unit 30 is lower than the protection reference voltage value, the battery protection process unit 504 stops the operation of the DC-DC converter circuit 70. With this process, the supply of electric power from the secondary battery unit 30 to the power supply unit 52 is stopped, and, thus, it is possible to prevent the secondary battery unit 30 from entering the excessively discharged state. The protection reference voltage value may be a voltage value which is higher than a voltage value at which the secondary battery unit 30 enters the excessively discharged state.

The charge upper limit value, the discharge lower limit value, and the protection reference voltage value may be stored in a memory provided in the charge and discharge control unit 50 or the battery protection process unit 504, and may be read as suitable.

The priority selection process unit 506 determines which one of the secondary battery unit 30 and the system power supply 100 is to be prioritized over the other for supplying the electric power to the power supply unit 52, and transmits a control signal to the prioritization circuit 65. For example, when the supply of electric power from the system power supply 100 is to be prioritized, the first switch circuit 72 is switched OFF and the second switch circuit 82 is switched ON.

The recovery circuit 60 acquires the output voltage of the secondary battery unit 30, compares the output voltage and the protection reference voltage value, and connects the third terminal 40c of the switching circuit 40 to one of the first terminal 40a and the second terminal 40b based on a result of the comparison. More specifically, the recovery circuit 60 outputs to the switching circuit 40 a switching signal to connect the third terminal 40c of the switching circuit 40 to the first terminal 40a, when the output voltage of the secondary battery unit 30 is higher than the protection reference voltage value. When the output voltage of the secondary battery unit 30 is lower than the protection reference voltage value, the recovery circuit 60 outputs a switching signal to the switching circuit 40 to switch the connection of the third terminal 40c of the switching circuit 40 from the first terminal 40a to the second terminal 40b. When the output voltage of the secondary battery unit 30 becomes lower than the protection reference voltage value at the time of power outage, the supply of electric power from the secondary battery unit 30 to the power supply unit 52 is disconnected by the battery protection process unit 504. Because of this, it is necessary to charge from the solar cell module 20 to the secondary battery unit 30 based on a criterion other than an instruction from the charge and discharge control unit 50. Thus, by connecting the third terminal 40c of the switching circuit 40 to the second terminal 40b by the recovery circuit 60, it is possible to automatically store the electric power in the secondary battery unit 30 by the value of the output voltage of the solar cell module 20.

An operation power supply of the recovery circuit 60 is supplied from a path different from the path for supply to the power supply unit 52 of the charge and discharge control unit 50. For example, a power supply is supplied from a secondary battery different from the secondary battery unit 30 or the power supply is supplied by the solar cell module 20. In addition, a circuit (not shown) for setting a voltage appropriate for the control of the charge switch circuit 24 is provided between the solar cell module 20 and the second terminal 40b of the switching circuit 40. For example, there is provided a voltage-reducing circuit which reduces the output voltage of the solar cell module 20 to a suitable voltage or the like.

Next, an operation of the electric power supply system 10 will be described. In the electric power supply system 10, during normal times, of the secondary battery unit 30 and the system power supply 100, the electric power is supplied with a higher priority from the system power supply 100 to the power supply unit 52 of the charge and discharge control unit 50. More specifically, with the control of the priority selection process unit 506 of the charge and discharge control unit 50, in the prioritization circuit 65, the first switch circuit 72 is switched OFF and the second switch circuit 82 is switched ON.

In this process, if the output voltage which is output from the secondary battery unit 30 and the system power supply 100 through the DC-DC converter circuit 70 and the AC-DC converter circuit 80 is, for example, 12 V, only the switch circuit 82 is switched ON, and a voltage of the second switch circuit 82 on the side of the connection point 79 is 12 V. On the other hand, although the first switch circuit 72 is switched OFF, because the diode 74 is connected in a forward direction from the DC-DC converter circuit 70 toward the connection point 79, a current attempts to flow. In this case, because a voltage drop by the diode 74 (for example, 0.7 V) is generated, the voltage of the first switch circuit 72 on the side of the connection point 79 is 11.3 V, which is lower than the voltage of 12 V of the second switch circuit 82 on the side of the connection point 79. Therefore, no electric power is supplied from the DC-DC converter circuit 70.

If the supply of electric power from the system power supply 100 is stopped during a time when the second switch circuit 82 is switched ON; that is, when the electric power is supplied from the system power supply 100 to the power supply unit 52, the voltage of the second switch circuit 82 on the side of the connection point 79 attempts to be reduced toward 0 V. As described above, the voltage of the first switch circuit 72 on the side of the connection point 79 is 11.3 V, and, thus, when the voltage of the second switch circuit 82 on the side of the connection point 79 becomes lower than this voltage, electric power starts to be supplied from the DC-DC converter circuit 70 toward the power supply unit 52.

As described, even when the supply of electric power is disconnected due to power outage or the like in the case where the supply of electric power from the system power supply 100 to the power supply unit 52 is prioritized, the electric power is automatically supplied from the secondary battery unit 30 through the DC-DC converter circuit 70 to the power supply unit 52.

An operational advantage of the electric power supply system 10 will now be described. In the electric power supply system 10, in the normal state, the electric power is supplied from the system power supply 100 through the AC-DC converter circuit 80 to the power supply unit 52. However, during an emergency time such as power outage, because the supply of electric power from the system power supply 100 is stopped, the electric power is supplied from the secondary battery unit 30 through the DC-DC converter circuit 70 to the power supply unit 52.

Further, when the output voltage of the secondary battery unit 30 becomes lower than the protection reference voltage value, the supply of electric power from the secondary battery unit 30 to the power supply unit 52 is disconnected by the battery protection process unit 504. In other words, when the output voltage of the secondary battery unit 30 becomes lower than the protection reference voltage value during power outage, the electric power is not supplied from the secondary battery unit 30 or from the system power supply 100 to the power supply unit 52, and the state of the charge control unit 50 transitions from a normal state to a sleep state. In this process, the charge switch circuit 24 and the discharge switch circuit 38 are switched OFF. In order to recover the charge and discharge control unit 50 from the sleep state to the normal state, it is necessary that the system power supply 100 be recovered or that the output voltage of the secondary battery unit 30 be higher than the protection reference voltage value. However, when the charge control unit 50 is in the sleep mode, because the charge switch circuit 24 is switched OFF, the electric power cannot be supplied from the solar cell module 20 to the secondary battery unit 30.

In consideration of this, in the electric power supply system 10, the third terminal 40*c* of the switching circuit 40 is connected to the first terminal 40*a* by the recovery circuit 60, to connect the control terminal 24*c* of the charge switch circuit 24 and the output terminal of the solar cell module 20. With this process, when the output voltage of the solar cell module 20 is greater than or equal to a predetermined value, the charge switch circuit 24 is automatically switched ON, and the generated electric power of the solar cell module 20 can be charged to the secondary battery unit 30. When the amount of storage of electricity in the secondary storage battery 30 becomes a sufficient amount; that is, when the output voltage of the secondary battery unit 30 becomes higher than the protection reference voltage value, the charge and discharge control unit 50 can recover from the sleep state to the normal state. In this manner, in the electric power supply system 10, when the output voltage of the secondary battery unit 30 becomes lower than the protection reference voltage value, the switching ON/OFF of the charge switch circuit 24 can be controlled by the output voltage of the solar cell module 20, and, thus, even during the power outage, the secondary battery unit 30 can be charged so long as the power is being generated by the solar cell module 20.

In the first preferred embodiment, in the prioritization circuit 65, two power source supply paths including a power source supply path having the first switch circuit 72 and the first diode element 74 and a power source supply path having the second switch circuit 82 and the second diode element 84 are provided. However, the number of power source supply paths is not limited to this number. The prioritization circuit 65 may further include other power source supply paths having structures similar to those of these power source supply paths. Here, the power source supply path may include elements other than the diode element described above. For example, each of the power source supply paths described above may include other diode elements. More specifically, another diode element may be connected on a side of the anode terminal of the first diode element 74 and in series in a same direction as the first diode element 74. Similarly, for the second diode element 84, another diode element may be connected in series. With such a configuration, even if the supply of electric power from the selected supply source becomes impossible, flow of the current from the non-selected supply source toward the selected supply source can be prevented.

(Second Preferred Embodiment)

Figure 2:
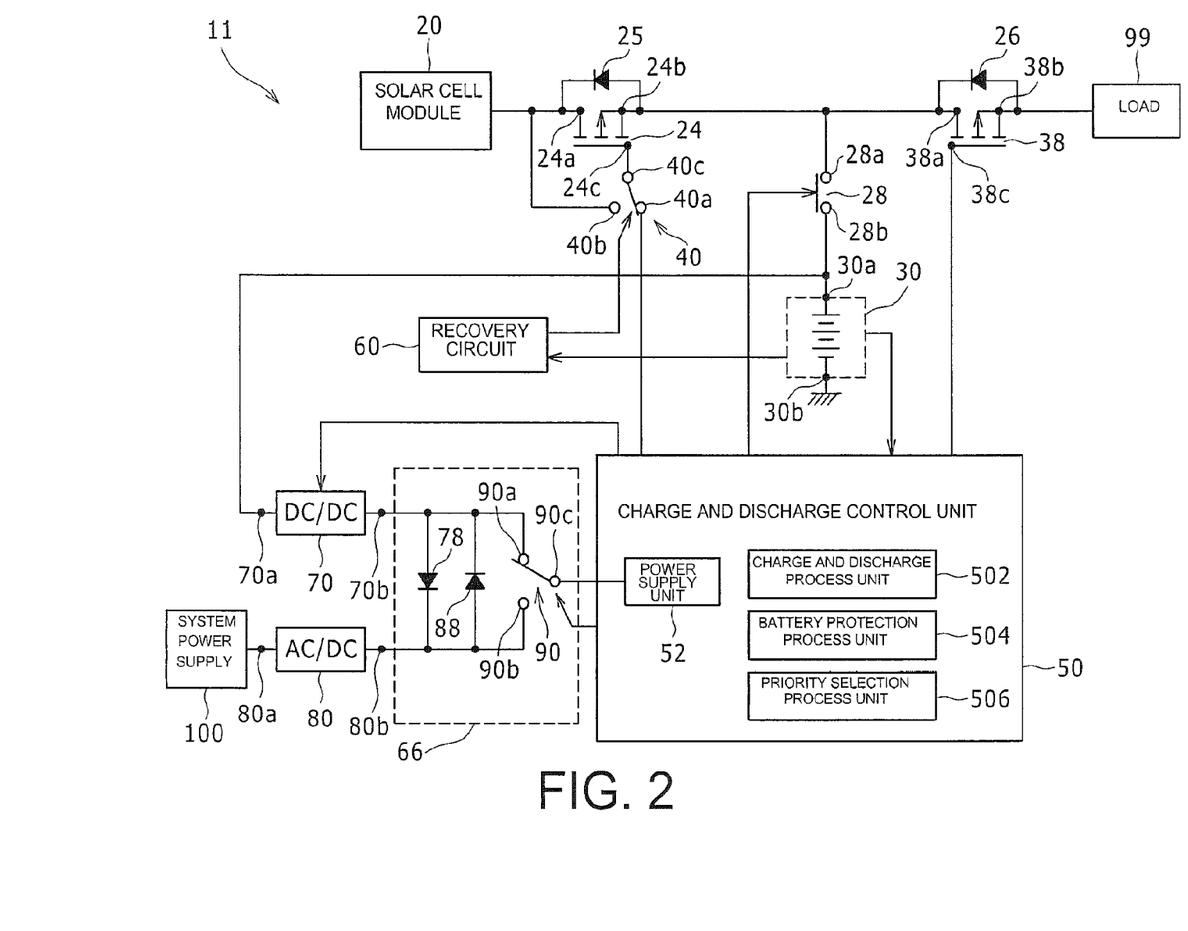
FIG. 2 is a diagram showing an electric power supply system according to a second preferred embodiment of the present invention.

Next, an electric power supply system 11 which is an alternative configuration of the electric power supply system 10 will be described. FIG. 2 is a diagram showing an electric power supply system 11. A primary difference between the electric power supply system 11 and the electric power supply system 10 resides in a prioritization circuit 66, and, thus, this difference will primarily be described.

The prioritization circuit 66 sets one of the secondary battery unit 30 and the system power supply 100 as a selected supply power source and the other one as a non-selected supply power source based on an instruction from the charge and discharge control unit 50, prioritizes the selected supply source over the non-selected supply power source, and supplies electric power from the selected supply source to the power supply unit 52 of the charge and discharge control unit 50 which is a target of the supply of the electric power. The prioritization circuit 66 has a first diode element 78, a second diode element 88, and a switching circuit 90.

The switching circuit 90 is a switch which switches between an electric power supply path from the system power supply 100 to the power supply unit 52 and an electric power supply path from the secondary battery unit 30 to the power supply unit 52 according to an instruction from the charge and discharge control unit 50. The switching circuit 90 has a first terminal 90*a*, a second terminal 90*b*, and a third terminal 90*c*. The first terminal 90*a* is connected to the output-side terminal 70*b* of the DC-DC converter circuit 70, the second terminal 90*b* is connected to the output-side terminal 80*b* of the AC-DC converter circuit 80, and the third terminal 90*c* is connected to the power supply unit 52. The switching circuit 90 switches the connection of the third terminal 90*c* to one of the first terminal 90*a* and the second terminal 90*b* according to an instruction from the charge and discharge control unit 50.

The first diode element 78 is a diode (rectifying element) having an anode terminal connected between the output-side terminal 70*b* of the DC-DC converter circuit 70 and the first terminal 90*a* of the switching circuit 90 and a cathode terminal connected between the output-side terminal 80*b* of the AC-DC converter circuit 80 and the second terminal 90*b* of the switching circuit 90. The first diode element 78 functions as a voltage-drop-generating unit.

The second diode element 88 is a diode (rectifying element) having an anode terminal connected between the output-side terminal 80*b* of the AC-DC converter circuit 80 and the second terminal 90*b* of the switching circuit 90 and a cathode terminal connected between the output-side terminal 70*b* of the DC-DC converter circuit 70 and the first terminal 90*a* of the switching circuit 90. The second diode element 88 functions as a voltage-drop-generating unit. As shown in FIG. 2, the secondary battery unit 30 and the system power supply 100, which are the two electric power supply sources, are connected to each other by a pair of rectifying elements (the first diode element 78 and the second diode element 88).

An operation of the electric power supply system 11 will now be described. In the electric power supply system 11, during normal times, of the secondary battery unit 30 and the system power supply 100, the electric power is supplied with a higher priority from the system power supply 100 to the power supply unit 52 of the charge and discharge control unit 50. More specifically, with the control of the priority selection process unit 506 of the charge and discharge control unit 50, the third terminal 90*c* of the switching circuit 90 is connected to the second terminal 90*b* in the prioritization circuit 66.

In this process, when the output voltage which is output from the secondary battery unit 30 and the system power supply 100 through the DC-DC converter circuit 70 and the AC-DC converter circuit 80 is, for example, 12 V, because the third terminal 90*c* of the switching circuit 90 is connected to the second terminal 90*b*, the voltage of the third terminal 90*c* is 12 V identical with the voltage of the AC-DC converter circuit 80. On the other hand, because of the voltage drop (for example, 0.7 V) of the diode element itself, the voltage on the side of the cathode of the first diode element 78 is 11.3 V. Because this voltage is lower than the voltage of 12 V of the third terminal 90*c*, the electric power is not supplied from the DC-DC converter circuit 70 through the first diode element 78 to the power supply unit 52.

If the supply of electric power from the system power supply 100 is stopped in the case where the third terminal 90*c* is connected to the second terminal 90*b*; that is, when the electric power is supplied from the system power supply 100 to the power supply unit 52, the voltage at the output-side terminal 80*b* attempts to be reduced toward 0 V. As described above, the voltage on the side of the cathode of the first diode element 78 is 11.3 V, and, when the voltage at the output-side terminal 80*b* becomes lower than this voltage, the electric power starts to be supplied from the DC-DC converter circuit 70 toward the power supply unit 52 through the first diode element 78.

As described, even if the supply of electric power is disconnected due to power outage or the like when the supply of electric power from the system power supply 100 to the power supply unit 52 is prioritized, the electric power is automatically supplied from the secondary battery unit 30 through the DC-DC converter circuit 70 to the power supply unit 52.

An operational advantage of the electric power supply system 11 will now be described. In the electric power supply system 11, in the normal state, the electric power is supplied from the system power supply 100 through the AC-DC converter circuit 80 to the power supply unit 52. However, in an emergency state such as power outage, because the supply of electric power from the system power supply 100 is stopped, the electric power is supplied from the secondary battery unit 30 through the DC-DC converter circuit 70 to the power supply unit 52.

In addition, in the electric power supply system 11, in comparison to the structure of the electric power supply system 10, the only difference lies in the prioritization circuit 66, and the other structures are the same. Therefore, with the electric power supply system 11 also, even when the charge and discharge control unit 50 transitions from the normal state to the sleep state and the charge switch circuit 24 is switched OFF, the third terminal 40*c* of the switching circuit 40 may be connected to the first terminal 40*a* by the recovery circuit 60 so that the electric power can be automatically stored in the secondary battery unit 30 by a value of the output voltage of the solar cell module 20. With this configuration, when the secondary battery unit 30 is sufficiently charged, the charge and discharge control unit 50 can be recovered from the sleep state to the normal state.

In the electric power supply systems 10 and 11 described above, of the secondary battery unit 30 and the system power supply 100, the electric power is supplied with a higher priority from the system power supply 100 to the power supply unit 52 of the charge and discharge control unit 50, but alternatively, the power supply to be prioritized may be switched. More specifically, a configuration may be employed in which, during normal times, of the secondary battery unit 30 and the system power supply 100, the electric power is supplied with a higher priority from the secondary battery unit 30 to the power supply unit 52 of the charge and discharge control unit 50, and, when the output voltage of the secondary battery unit 30 becomes low, the power supply may be switched to the system power supply 100. Here, if power outage occurs during the time when the power supply is switched to the system power supply 100, the third terminal 40*c* of the switching circuit 40 may be connected to the first terminal 40*b*, to automatically store the electric power to the secondary battery unit 30 by the output voltage of the solar cell module 20.

In addition, in the electric power supply systems 10 and 11 described above, of the secondary battery unit 30 and the system power supply 100, the electric power is supplied with a higher priority from the system power supply 100 to the power supply unit 52 of the charge and discharge control unit 50, but alternatively, a configuration may be employed in which the system power supply 100 is not set as the operational power supply from the beginning. More specifically, a configuration may be employed in which, during normal times, of the secondary battery unit 30 and the system power supply 100, the electric power is supplied only from the secondary battery unit 30 to the power supply unit 52 of the charge and discharge control unit 50, and, when the output voltage of the secondary battery unit 30 is reduced, the third terminal 40c of the switching circuit 40 is connected to the first terminal 40b so that the electric power is automatically stored in the secondary battery unit 30 by the output voltage of the solar cell module 20.

(Third Preferred Embodiment)

Figure 3:
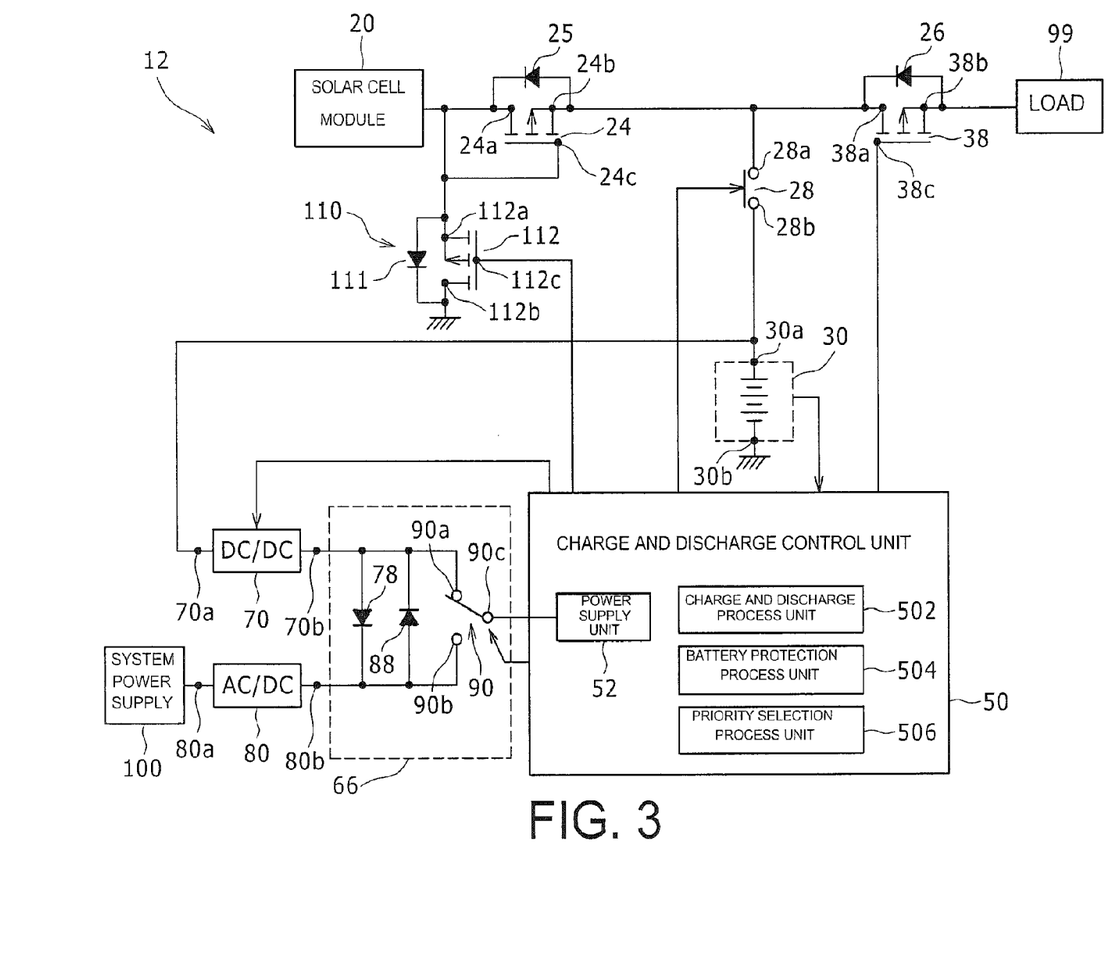
FIG. 3 is a diagram showing an electric power supply system according to a third preferred embodiment of the present invention.

Next, an electric power supply system 12 which is an alternative configuration of the electric power supply systems 10 and 11 will be described. FIG. 3 is a diagram showing the electric power supply system 12. A primary difference between the electric power supply system 12 and the electric power supply systems 10 and 11 resides in that a switching circuit unit 110 is used in place of the recovery circuit 60 and the switching circuit 40, and this difference will primarily be described.

The switching circuit unit 110 has a diode element 111 and a switch circuit 112. One terminal of the switching circuit unit 110 is connected to the solar cell module 20 and the control terminal 24c of the charge switch circuit 24, and the other terminal is grounded. The diode element 111 and the switch circuit 112 may be formed from elements similar to those of the diode element 25 and the switch circuit 24, respectively, and, thus, will not be described in detail.

The switch circuit 112 is a circuit (third switch unit) having a first terminal 112a, a second terminal 112b, and a control terminal 112c. The first terminal 112a is connected to an anode terminal of the diode element 111, the solar cell module 20, and the control terminal 24c. The second terminal 112b is connected to a cathode terminal of the diode element 111 and is grounded. The control terminal 112c is connected to the charge and discharge control unit 50, and the switch circuit 112 is switched ON and OFF by control of the charge and discharge control unit 50. A circuit (not shown) for setting to a suitable voltage for the control of the charge switch circuit 24 is provided between the solar cell module 20 and the control terminal 24c of the charge switch circuit 24. For example, a voltage-reducing circuit which reduces the output voltage of the solar cell module 20 to a suitable voltage or the like is provided.

An operational advantage of the electric power supply system 12 will now be described. During normal times, the switch circuit 112 is controlled to be switched ON by the control of the charge and discharge control unit 50. In this process, because a potential of the control terminal 24c of the charge switch circuit 24 is 0 V, the charge switch circuit 24 is in the OFF state. During the power outage, because the output potential from the charge and discharge control unit 50 becomes 0 V, the switch circuit 112 is set in the OFF state. In this case, because the output voltage of the solar cell module 20 is supplied to the control terminal 24c of the charge switch circuit 24, the charge switch circuit 24 is set in the ON state. With this configuration, the electric power can be automatically stored in the secondary battery unit 30 by the value of the output voltage of the solar cell module 20, and, thus, similar to the electric power supply systems 10 and 11, the charge and discharge control unit 50 can be recovered from the sleep state to the normal state when the secondary battery unit 30 is sufficiently charged.

(Fourth Preferred Embodiment)

Figure 4:
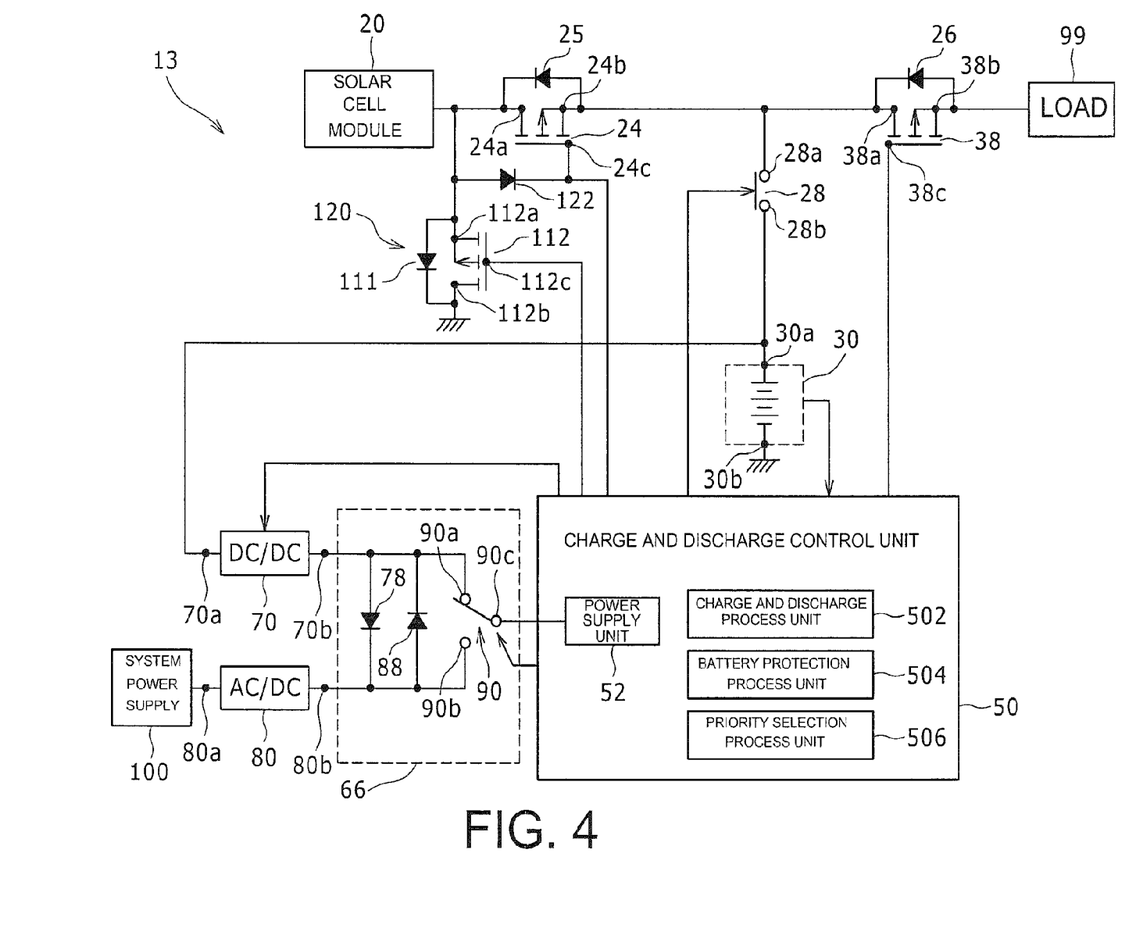
FIG. 4 is a diagram showing an electric power supply system according to a fourth preferred embodiment of the present invention.

Next, an electric power supply system 13 which is an alternative configuration of the electric power supply system 12 will be described. FIG. 4 is a diagram showing the electric power supply system 13. A primary difference between the electric power supply system 13 and the electric power supply system 12 resides in a switching circuit unit 120, and this difference will primarily be described.

The switching circuit unit 120 has the diode element 111, the switch circuit 112, and a diode element 122. The diode element 111 and the switch circuit 112 are identical to those of the switching circuit unit 110, and, thus, will not be described in detail.

An anode terminal of the diode element 122 is a rectifier element connected to the solar cell module 20, the anode terminal of the diode element 111, and the first terminal 112a of the switch circuit 112. A cathode terminal of the diode element 122 is connected to the control terminal 24c of the charge switch circuit 24 and the charge and discharge control unit 50. A circuit (not shown) for setting a suitable voltage for control of the charge switch circuit 24 is provided between the solar cell module 20 and the control terminal 24c of the charge switch circuit 24. For example, a voltage-reducing circuit which reduces the output voltage of the solar cell module 20 to a suitable voltage or the like is provided.

An operational advantage of the electric power supply system 13 will now be described. During normal times, the switch circuit 112 is controlled to be switched ON by the control of the charge and discharge control unit 50. In this configuration, because the potential of the anode terminal of the diode element 122 is 0 V, the diode element 122 is in the OFF state. Therefore, the control of the control terminal 24c of the charge switch circuit 24 is executed by the charge and discharge control unit 50. During power outage, however, the output potential from the charge and discharge control unit 50 becomes 0 V and the switch circuit 112 is in the OFF state, but the output voltage of the solar cell module 20 is supplied to the anode terminal of the diode element 122. Therefore, with the application of the output voltage of the solar cell module 20, the diode element 122 is set in the ON state. Because of this, the charge switch circuit 24 is also switched ON, and the electric power can be automatically stored in the secondary battery unit 30 by the value of the output voltage of the solar cell module 20. Therefore, similar to the electric power supply systems 10-12, the charge and discharge control unit 50 can be recovered from the sleep state to the normal state when the secondary battery unit 30 is sufficiently charged.

The invention claimed is:

1. An electric power supply system which supplies electric power to a load which is connected thereto, the electric power supply system comprising:
   a secondary battery which stores electric power generated by a power generator using natural energy;
   a first switch unit which disconnects and connects a charge path between the power generator and the secondary battery; and
   a control unit which controls the disconnection and the connection of the charge path by the first switch unit, wherein
   in the first switch unit, the disconnection and the connection of the charge path are controlled also by an output voltage of the power generator, wherein
   the control unit detects an output voltage of the secondary battery, compares the detected output voltage to a predetermined reference voltage, and judges whether the detected output voltage is higher or lower than the reference voltage, and
   the control unit controls the disconnection and the connection of the charge path by the first switch unit when the control unit judges that the output voltage of the secondary battery is higher than the reference voltage, and wherein
   the first switch unit includes a control terminal which is connected to an output terminal of the power generator or to the control unit to receive a control instruction from the power generator or the control unit, and the electric power supply system further comprises a second switch unit which switches between a connection of the control terminal of the first switch unit and the output terminal of the power generator and a connection of the control terminal of the first switch unit and the control unit based on a result of judgment by the control unit.

* * * * *